United States Patent [19]  [11] 4,168,662
Fell  [45] Sep. 25, 1979

[54] VIDEOJET INK FOR PRINTING ON FOOD PRODUCTS

[75] Inventor: David A. Fell, Menasha, Wis.

[73] Assignee: American Can Company, Greenwich, Conn.

[21] Appl. No.: 901,215

[22] Filed: Apr. 28, 1978

[51] Int. Cl.$^2$ .................. B41M 1/40; B41M 1/42; C09D 11/08
[52] U.S. Cl. ........................ 101/426; 106/22; 106/30; 426/250; 426/262; 426/383; 426/540
[58] Field of Search ............. 106/30, 22; 101/426; 426/383, 540, 262, 250

[56] References Cited

U.S. PATENT DOCUMENTS

| | | | |
|---|---|---|---|
| 2,982,234 | 5/1961 | Ackley et al. | 106/30 |
| 2,991,184 | 7/1961 | Bernardi et al. | 106/30 |

*Primary Examiner*—J. Ziegler
*Attorney, Agent, or Firm*—Robert P. Auber; Ira S. Dorman; George P. Ziehmer

[57] ABSTRACT

Ink compositions suitable for ink jet printing on a variety of substrates and particularly food products, for example citrus fruit, and method of marking such products are provided. The compositions are characterized by their ability to penetrate the waxed surfaces of such foods as citrus fruits to provide markings therein. Preferred compositions comprise essentially a solution of a food dye or combination thereof, a binder resin component, a solvent mixture containing alcohol, water and an organic compound selected from the group consisting of aliphatic hydrocarbons having 5 to 12 carbon atoms and aliphatic ketones; and, optionally, an electrolyte.

19 Claims, No Drawings

VIDEOJET INK FOR PRINTING ON FOOD PRODUCTS

BACKGROUND OF THE INVENTION

1. Prior Art

The prior art appears to be best exemplified by the following patents:

| | | |
|---|---|---|
| Banczak | 4,021,252 | May 3, 1977 |
| Hwang | 4,070,322 | Jan. 24, 1978 |
| Hertz | 3,994,736 | Nov. 30, 1976 |
| Ostergren | 3,846,141 | Nov. 5, 1974 |

2. Field of the Invention

This invention relates to ink jet printing compositions suitable for forming colored indicia on a variety of substrates including food products, for example citrus or any light colored fruit, eggs, hard candy, meat, animal hides; packaging materials in contact with food, for example egg cartons, or other paper and metal food packaging materials.

The invention of this application relates especially to ink jet printing compositions and their use in producing markings or other indicia on certain food products and food packaging. The compositions are particularly useful in ink jet printing on waxed or waxy surfaces such as citrus fruits.

Ink jet printing techniques, although of comparatively recent development in the art of applying decorative and/or identifying indicia to a substrate, are of increasing importance. In general, such techniques impose rigid requirements on the ink compositions. To be suitable for use as a jet ink, the compositions must meet rigid requirements of viscosity and resistivity, solubility, compatibility of components and wettability of substrate; the ink must be quick-drying and smear resistant without clogging the ink jet nozzle and must permit clean-up of the machine components with minimum effort. At the same time, such compositions must also be adapted for satisfactory performance in the particular end use for which they are specifically intended.

It has now been found that ink jet printing techniques may be applied and used to form markings or other identifying indicia to the surfaces of certain food packages, food products and especially to citrus fruits.

It is an object of this invention to provide an ink for use in the ink jet printing of indicia on food surfaces which combines properties necessary for satisfactory operation of the ink in the printing apparatus with the properties necessary for obtaining and preserving a satisfactory printed image on the particular food substrate.

It is a further object of this invention to provide an ink suitable in all respects for applying indicia to the surfaces of food products and particularly citrus fruits.

Further objects will become apparent from the following specification and claims.

DESCRIPTION OF THE PREFERRED EMBODIMENT

The ink compositions of this invention contain a food colorant, a solvent blend and other optional ingredients, all of which must be in carefully balanced proportion to achieve (1) successful operation of the ink in a jet printing operation and, (2) suitable properties for use in coating food products, for example citrus fruits.

In general, suitability of the inks herein for the desired end use is measured in accordance with the following standards:

(1) inks must dry instantly or be smear resistant upon application and dry completely within about 20 seconds;

(2) The ink must be resistant to abrasion and moisture on a waxed surface such as that occurring on citrus fruit;

(3) The ink must include only non-toxic chemicals approved for use on food by the U.S. Food and Drug Administration (FDA).

The above characteristics are stringent requirements for an ink composition which additionally must also meet the requisite requirements of viscosity, electrical resistivity and surface tension properties, etc. to render it operable in ink jet printing apparatus. The ink compositions of this invention meet these requirements.

COMPONENTS OF THE COMPOSITIONS

The Colorant

The prime requirements that the colorant must exhibit to be satisfactory for use herein are sufficient solubility in the solvent mixture to give the desired color intensity, abrasion and moisture resistance and FDA suitability for use on foods.

Several food dyes have been found to be suitable for use herein including FD&C Red Dye #3 and FD&C Blue Dye #1 available commercially from H. Kohnstamm & Co., Inc. Red Dye #3 is particularly preferred herein.

Such dyes may be present in the ink compositions in amounts varying from about 1.0% to the solubility limit of the dye in the solvents. Generally such amount will be less than 10% and will preferably be within the range of about 1% to about 5%.

The Binder Resin

The preferred binder is dewaxed and bleached shellac or its equivalent although any comparable resin having the requisite properties of non-toxicity, solubility in the solvent and ability to anchor the colorant on the food surface may be employed. A particularly preferred form of such resin is a mixture comprising about 30% by weight shellac and about 70% ethanol available commercially as EV675 from M&T Chemicals, Inc. In general, such resin component in ethanol will comprise from about 4% to about 10% of the ink composition based on the dry resin.

The Solvent Blend

Although minor amount of other solvents may be included in the overall ink composition, the primary solvent blend is a mixture of (a) from about 70% to about 80% by volume of the solvent blend of a lower aliphatic alcohol having 1 to 3 carbon atoms or mixtures thereof (b) from about 7 to about 12% by volume of water (c) from about 0.3% to about 0.6% to 26° Baume ammonia or similar alkalizing agent and, (d) from about 10% to about 16% of an organic compound selected from the group consisting of aliphatic hydrocarbons having 5 to 12 carbon atoms and aliphatic ketones.

These components based on the total weight of the ink compositions will be present in the preferred compositions in amounts corresponding to about 70% lower aliphatic alcohol, about 10% water, about 0.5% ammonia and about 13% organic compound.

The presence of these solvent components and their respective functions are critical to the above-mentioned end-use characteristics of the ink.

As previously discussed, the components of the ink must be in carefully balanced proportion to achieve successful operation of the ink in a jet printing apparatus for use on food surfaces.

The binder, alcohol and water are utilized in such proportions that the viscosity (Brookfield) of the ink is maintained within the range of about 1.5 to 3.0 centipoises at a temperature of about 74° F. For example, a weight ratio of water to alcohol of 0.152 with about 5% shellac results in an ink having a viscosity of 2.10 centipoises.

A small amount of ammonia or similar alkalizing agent, in the form of a concentrated aqueous solution, is added to the ink to maintain the system in the pH range of about 7 to about 8.5. The ammonia also serves to stabilize the resin component in the sense that shellac degrades if the ink becomes unduly acidic.

An organic compound that is either an aliphatic hydrocarbon having from abut 5 to 12 carbon atoms or an aliphatic ketone having at least 4 carbon atoms is an essential component of the ink composition of this invention since it functions to provide penetrating characteristics to the ink imparting ability to fix the colorant in the subsurface of the citrus fruit skin for example rendering it substantially abrasion-proof. In uses of the compositions where waxy or oily surfaces are not involved, these components may be omitted if desired. Typical penetrating compounds that are suitable for use include heptane, hexane, pentane and their isomers and mixtures thereof; aliphatic ketones ranging in molecular structure from 2-butanone to 2-octanone, i.e. having 4 to 8 carbon atoms including particularly 2-heptanone, 2,4-pentanedione, 3-hetanone, 2-butanone, etc.

Optionally an electrolyte may be employed to maintain the specific resistivity of the ink within desired limits. Optimum results have been obtained when employing sodium acetate and similar salts for this purpose. Use of such compounds may be employed in amounts varying from about 0% to about 1.0% by weight of the composition. Other compounds suitable for use as electrolytes include sodium propionate, potassium acetate and potassium propionate.

The following examples are illustrative of ink compositions according to this invention whch are effective in jet printing of foods.

EXAMPLE 1

Red ink compositions were prepared from the following formulations:

Formulation A

| 275 ml. | Solox (denatured ethanol) |
| --- | --- |
| 35 ml. | distilled water |
| 3 g. | sodium acetate |
| 30 ml. | EV-675 (30% shellac–70% ethanol) |
| 2 ml. | 26° Baume ammonium hydroxide |
| 7 g. | FD&C Red Dye #3 |
| 35 ml. | Hexane |

The resulting ink composition has a Brookfield viscosity of 2.10 cps. at 74° F., a resistivity of 880 ohm. cm., a velocity of sound of 1264 meters/second, a pH of 7.5 to 8.5 and a density of 0.8505 gm/cm$^3$.

Formulation B

| 2468 ml. | (57.6%) | Solox |
| --- | --- | --- |
| 353 ml. | (10.4%) | distilled water |
| 20 ml. | (0.5%) | ammonium hydroxide 26° Baume |
| 80.6 g. | (2.4%) | FD&C Red Dye #3 |
| 554 ml. | (13.3%) | 2-heptanone |
| 605 ml. | (15.8%) | EV-675 (30% shellac–70% ethanol) |

The resulting ink composition had a resistivity of 600 ohm. cm., a pH of 7.7 and a Brookfield viscosity of 1.81 cps. at 74° F.

The above inks were used in the jet printing of indicia on oranges. The printed indicia dried very quickly to form images displaying excellent adhesion to the orange skins, high resistance to abrasion and adequate resistance to water.

Similar results may be obtained if 2-heptanone is substituted for hexane in composition A.

During more than 1378 hours of operation of the jet printing units with the ink composition B set forth above, evaporative losses from the ink supply system were compensated for by the addition, as needed, of a makeup composition containing 3221 ml. Solox, 170 ml. distilled water, 80 ml. 26° Baume ammonium hydroxide and 314 ml. 2-heptanone.

EXAMPLE 2

A red ink composition was prepared from the following formulation:

| 255 ml. | Solox |
| --- | --- |
| 35 ml. | distilled water |
| 3 g. | sodium acetate |
| 50 ml. | EV-675 |
| 2 ml. | 26° Baume ammonium hydroxide |
| 8 g. | FD&C Red Dye #3 |
| 50 ml. | 2-heptanone |

The resulting ink composition had a Brookfield viscosity of 2.04 cps., a resistivity of 520 ohm. cm. and a pH of 7.7.

The ink was used in the jet printing of indicia on oranges, lemons and grapefruit.

EXAMPLE 3

A. A blue ink was prepared from the following formulation:

| 275 ml. | Solox |
| --- | --- |
| 35 ml. | distilled water |
| 3 g. | sodium acetate |
| 2 ml. | 26° Baume ammonium hydroxide |
| 30 ml. | EV-675 |
| 35 ml. | hexane isomers |
| 7 g. | FD&C Blue Dye #1 |

The ink had a resistivity of 730 ohm. cm. at 74° F., a Brookfield viscosity of 1.87 centipoises at 74° F. and a pH of 7.7.

B. A purple ink was prepared from the following formulation:

| 275 ml. | Solox |
| --- | --- |
| 35 ml. | distilled water |
| 3 g. | sodium propionate |
| 30 ml. | EV-675 |

|   |   |
|---|---|
| 2 ml. | 26° Baume ammonium hydroxide |
| 4 g. | FD&C Red Dye #3 |
| 4 g. | FD&C Blue Dye #1 |
| 35 ml. | 2-heptanone |

The ink had a resistivity of 570 ohm.-cm. at 75° F., a Brookfield viscosity of 2.02 centipoises at 75° F. and a pH of 7.7.

The above inks were utilized in the ink jet printing of oranges and exhibited adequate adhesion and resistance to abrasion and water.

It will be seen from the above that the compositions of the invention are valuable in permitting rapid marking of food surfaces with identifying indicia that are permanent and that have adequate abrasion and moisture resistance. The ink jet printing of food surfaces such as the skins of citrus fruits is unique conveying all the advantages of rapid processing, rapid change-over of codes, etc. to this use of jet printing as are realized in jet printing of the usual substrates such as paper, plastic, etc. Such ease and speed has not heretofore been realized since prior to this invention, foods such as citrus fruits have been marked by a process wherein the markings are stamped on the fruit by a conventional contact printing process. An additional advantage of applying such indicia to food surfaces by jet printing is that the possibility of bruising or otherwise marring the fruit or other food is eliminated.

I claim:

1. An ink composition suitable for use in jet printing of food surfaces and food packaging comprising a non-toxic solution of (a) a soluble binder resin (b) a food dye (c) a solvent for said resin and said dye consisting essentially of an aliphatic alcohol having 1 to 3 carbon atoms, water and an organic compound selected from the group consisting of aliphatic hydrocarbons having 5 to 12 carbon atoms and aliphatic ketones and, optionally, (d) an electrolyte.

2. An ink composition as claimed in claim 1 wherein said binder resin is food grade shellac.

3. An ink composition as claimed in claims 1 or 2 wherein said solvent comprises ethanol, water and an organic compound selected from the group consisting of heptane, hexane, pentane, 2-butanone, 2-heptanone, 2,4-pentanedione, 3-heptanone and mixtures thereof.

4. An ink composition as claimed in claim 3 wherein said electrolyte is sodium acetate.

5. An ink composition as claimed in claim 3 wherein said solution also contains ammonium hydroxide.

6. An ink composition suitable for use in ink jet printing of citrus fruits comprising a non-toxic solution of (a) from about 3% to about 8% by weight of shellac, (b) from about 1% to about 3% by weight of a food dye (c) from about 0.3% to about 0.6% by weight of 26° Baume ammonium hydroxide (d) from about 88% to about 95% of a solvent consisting essentially of about 70% to about 75% methanol, ethanol or isopropanol or mixtures thereof; from about 10% to about 12% water, 13% to about 15% hexane or 2-heptanone and (e) from about 0% to about 1.0% sodium acetate.

7. An ink composition suitable for use in jet printing of citrus fruit comprising a non-toxic solution of (a) 275 parts of denatured ethanol, 35 parts of distilled water, 3 parts sodium acetate, 35 parts hexane, 30 parts of a mixture comprising 30 parts shellac and 70 parts ethanol, 2 parts 26° Baume ammonium hydroxide and 7 parts FD&C Red Dye #3.

8. An ink composition suitable for use in jet printing of citrus fruit comprising a non-toxic solution of about 57.6% ethanol, 10.4% distilled water, 0.5% 26° Baume ammonium hydroxide, 2.4% FD&C Red Dye #3, 13.3% 2-heptanone and 15.8% of a mixture comprising 30% shellac and 70% ethanol.

9. An ink composition suitable for use in jet printing of citrus fruit comprising a non-toxic solution of 275 parts denatured ethanol, 35 parts distilled water, 3 parts sodium acetate, 2 parts 26° Baume ammonium hydroxide, 30 parts of a mixture of 30% shellac and 70 parts ethanol, 4 parts FD&C Red Dye #3, 4 parts FD&C Blue Dye #1 and 35 parts 2-heptanone.

10. An ink composition suitable for use in jet printing of citrus fruit comprising a non-toxic solution of 275 parts denatured ethanol, 35 parts distilled water, 3 parts sodium acetate, 2 parts 26° Baume ammonium hydroxide, 30 parts of a mixture comprising 30 parts shellac and 70 parts ethanol, 35 parts hexane and 7 parts FD&C Blue Dye #1.

11. In a method of marking the surfaces of citrus fruit comprising the step of forming indicia on said fruit surfaces using an ink composition, the improvement which comprises applying said indicia to said fruit surfaces by jet printing an ink composition comprising a non-toxic solution of (a) a soluble binder resin (b) a food dye (c) a solvent for said resin and said dye consisting essentially of an aliphatic alcohol having 1 to 3 carbon atoms, water and an organic compound selected from the group consisting of aliphatic hydrocarbons having 5 to 12 carbon atoms and aliphatic ketones and, optionally, (d) an electrolyte;

12. The improvement as claimed in claim 11 wherein said binder resin is food grade shellac.

13. The improvement as claimed in claims 11 or 12 wherein said solvent comprises ethanol, water and an organic compound selected from the group consisting of heptane, hexane, pentane, 2-butanone, 2-heptanone, 2,4-pentanedione, 3-heptanone and mixtures thereof.

14. The improvement as claimed in claim 13 wherein said solution contains sodium acetate and ammonium hydroxide.

15. The improvement as claimed in claim 11 wherein said ink composition comprises a solution of (a) from about 3% to about 8% of shellac, (b) from about 1% to about 3% of a food dye (c) from about 1% to about 3% of ammonium hydroxide (d) from about 88% to about 95% of a solvent consisting essentially of about 75% methanol, ethanol propanol or mixtures thereof, 10% to about 12% water, about 15% hexane or 2-heptanone and (e) from about 0% to about 1.0% sodium acetate.

16. In a method of marking the surfaces of citrus fruit comprising the step of forming indicia on said fruit surfaces using an ink composition, the improvement which comprises applying said indicia to said fruit surfaces by jet printing an ink composition comprising a non-toxic solution of 275 parts denatured ethanol, 35 parts of distilled water, 3 parts sodium acetate, 2 parts 26° Baume ammonium hydroxide, 30 parts of a mixture comprising 30 parts shellac and 70 parts ethanol, 35 parts of hexane and 7 parts FD&C Blue Dye #1.

17. In a method of marking the surfaces of citrus fruit comprising the step of forming indicia on said fruit surfaces using an ink composition, the improvement which comprises applying said indicia to said fruit surfaces by jet printing an ink composition comprising a non-toxic solution of (a) 275 parts of denatured ethanol, 35 parts of distilled water, 3 parts sodium acetate, 35 parts hexane, 30 parts of a mixture comprising 30 parts shellac and 70 parts ethanol, 2 parts 26° Baume ammonium hydroxide and 7 parts FD&C Red Dye #3.

18. In a method of marking the surfaces of citrus fruit comprising the step of forming indicia on said fruit surfaces using an ink composition, the improvement which comprises applying said indicia to said fruit surfaces by jet printing an ink composition comprising a non-toxic solution of about 57.6% ethanol, 10.4% distilled water, 0.5% 26° Baume ammonium hydroxide, 2.4% FD&C Red Dye #3, 13.3% 2-heptanone and 15.8% of a mixture comprising 30% shellac and 70% ethanol.

19. In a method of marking the surfaces of citrus fruit comprising the step of forming indicia on said fruit surfaces using an ink composition, the improvement which comprises applying said indicia to said fruit surfaces by jet printing an ink composition comprising a non-toxic solution of 275 parts denatured ethanol, 35 parts distilled water, 3 parts sodium acetate, 2 parts 26° Baume ammonium hydroxide, 30 parts of a mixture comprising 30 parts shellac and 70 parts ethanol, 35 parts 2-heptanone, 4 parts FD&C Red Dye #3 and 4 parts FD&C Blue Dye #1.

* * * * *